No. 694,284. Patented Feb. 25, 1902.
J. W. JEFFERSON.
MACHINE FOR HARVESTING ONION SETS OR SIMILAR CROPS.
(Application filed July 6, 1901.)
(No Model.) 3 Sheets—Sheet 1.

WITNESSES:

INVENTOR
J. W. Jefferson
BY
ATTORNEYS

No. 694,284. Patented Feb. 25, 1902.
J. W. JEFFERSON.
MACHINE FOR HARVESTING ONION SETS OR SIMILAR CROPS.
(Application filed July 6, 1901.)
(No Model.) 3 Sheets—Sheet 2.

WITNESSES:

INVENTOR
J. W. Jefferson
BY
ATTORNEYS

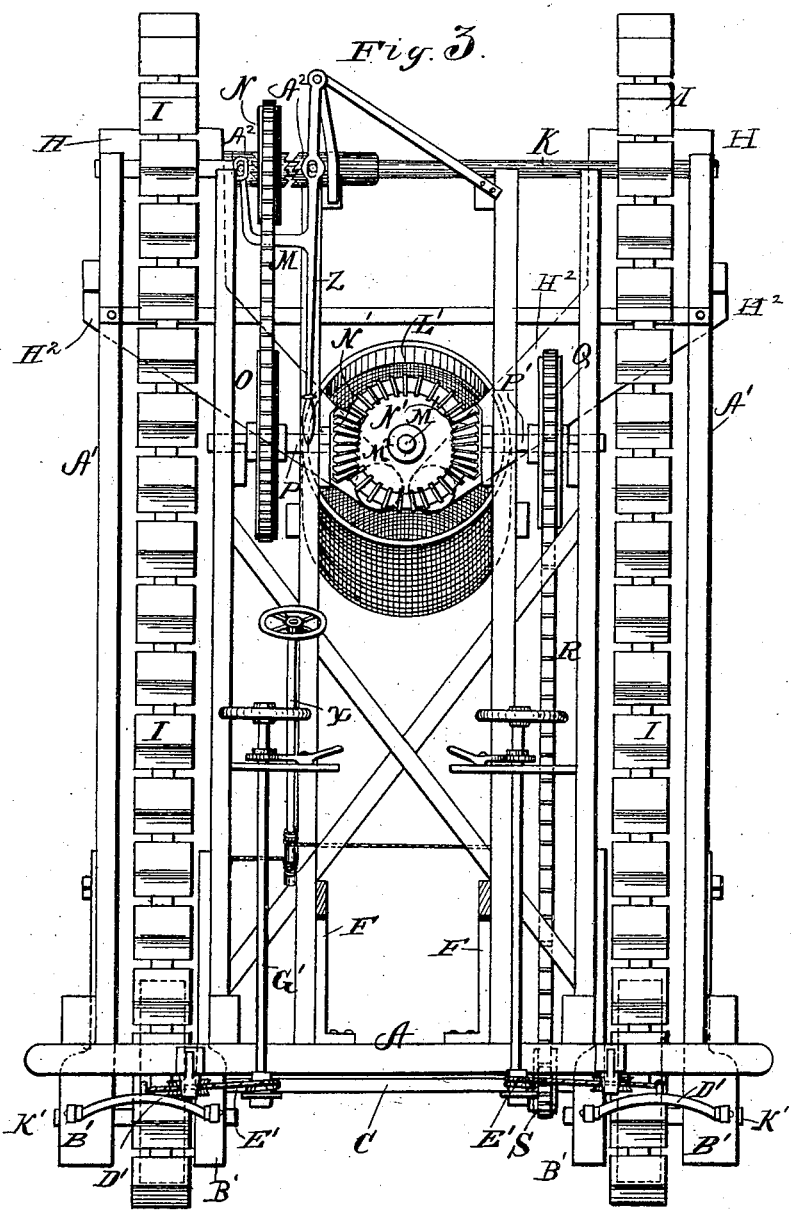

UNITED STATES PATENT OFFICE.

JOHN WILL. JEFFERSON, OF LOUISVILLE, KENTUCKY.

MACHINE FOR HARVESTING ONION SETS OR SIMILAR CROPS.

SPECIFICATION forming part of Letters Patent No. 694,284, dated February 25, 1902.

Application filed July 6, 1901. Serial No. 67,324. (No model.)

*To all whom it may concern:*

Be it known that I, JOHN WILLIAM JEFFERSON, a citizen of the United States, residing at Louisville, in the county of Jefferson and State of Kentucky, have invented a new and Improved Machine for Harvesting Onion Sets or Similar Crops, of which the following is a specification.

My invention is an improvement in that class of machines for harvesting onion sets, onions, and other vegetables in which an endless traveling digger is employed, the same consisting of a series of cups or scoops adapted to enter the soil and take up a portion therewith the contained vegetables and deliver the same into a sieve or other equivalent device by which the soil is separated and the vegetables discharged at the rear end of the machine.

The several features of novelty and improvement are hereinafter described, references being had to the accompanying drawings, in which—

Figure 1:
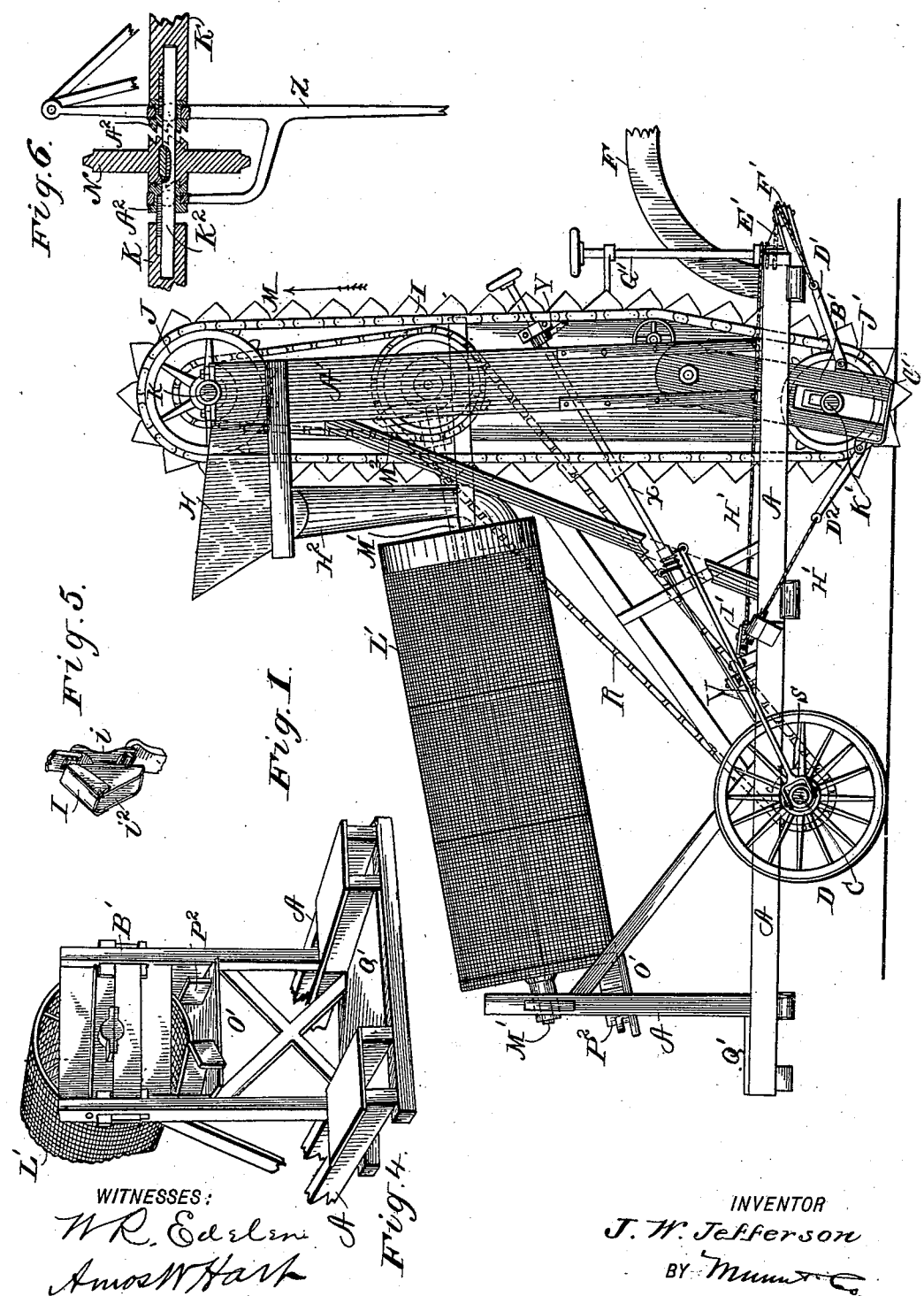
Figure 2:
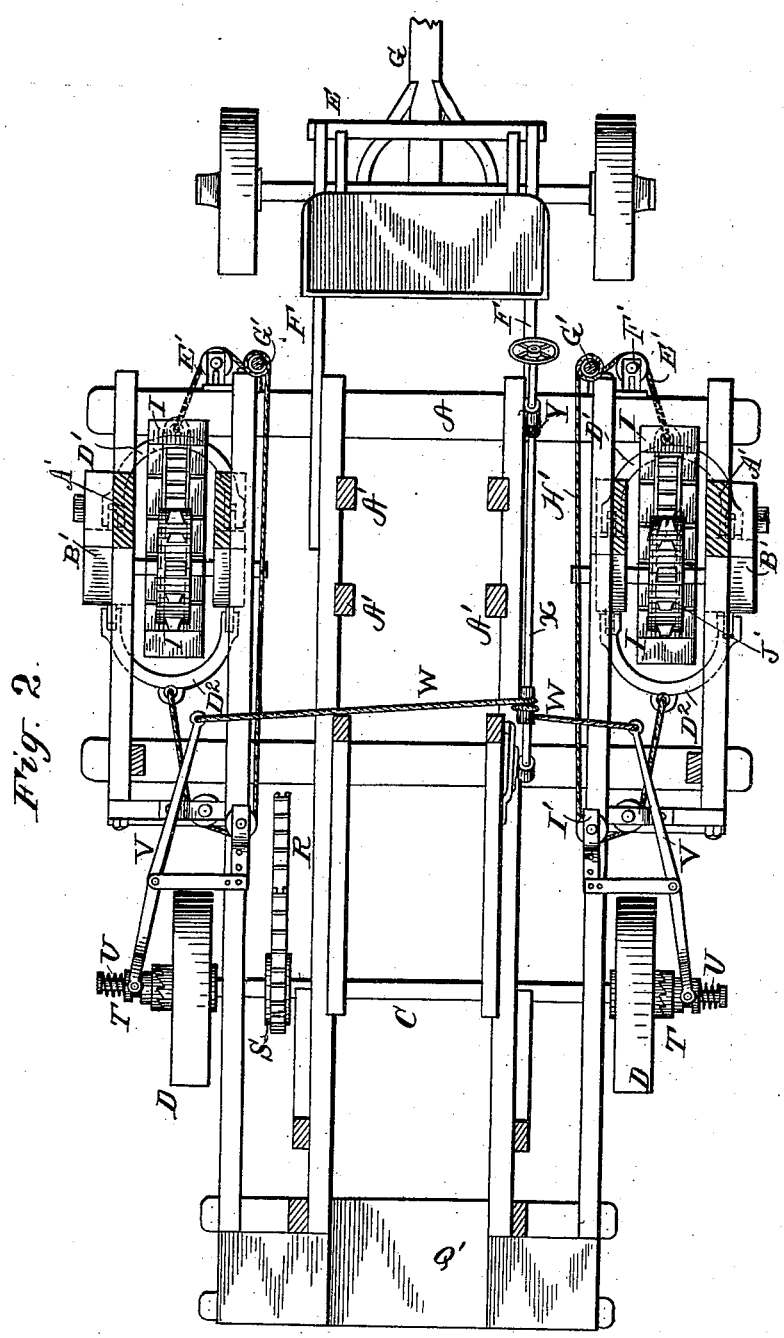

Figure 1 is a side view of the machine, omitting the forward truck. Fig. 2 is a horizontal section of the machine. Fig. 3 is a front elevation of the machine, omitting the front truck. Fig. 4 is a perspective view of the rear portion of the machine. Fig. 5 is a perspective view of one of the digging-scoops and a portion of the chain to which they are attached. Fig. 6 is a sectional detail hereinafter described.

The frame of the machine is composed of two main parts—to wit, the horizontal part A and the vertical part A'—each consisting of a series of parallel bars and both rigidly connected and duly braced. The rear portion of the frame is supported upon a rotatable axle C, having broad running wheels D, and the front portion of the frame is supported by a truck E, which is swiveled to curved arms F, forming a rigid attachment of the frame. The said truck E is provided with a tongue or pole G, as usual in this class of machines.

The onion sets or other crop are removed from the earth and elevated into a hopper H by means of endless traveling digger composed of chains I, (see Figs. 1 and 5,) having scoops secured to every second or third link. Said endless diggers are arranged to run vertically on sprocket-wheels J and J'. The sprocket-wheels J are keyed upon a divided or two-part shaft K, arranged rotatably in bearings fixed on the upper ends of the vertical frame A', and the lower sprocket-wheels J' are mounted on axles K', arranged below the horizontal portion A of the frame and adapted for a limited vertical and lateral movement, as will be further described. Rotary motion is communicated to either part of the upper shaft K (see Figs. 1 and 3) through the medium of a sprocket-chain M, running on a wheel N, keyed on a shaft $K^2$, (see Fig. 6,) having its bearings in sockets formed in the adjacent inner ends of the alined portions of shaft K. The chain M runs on a sprocket-wheel O, keyed on a counter-shaft P, arranged at a lower point in the portion A' of the frame. Another sprocket-wheel Q is keyed on a shaft P', alined horizontally with the shaft P and geared therewith, as will be hereinafter described, and another sprocket-chain R runs on the wheel Q and extends to a similar sprocket-wheel S, which is keyed on the rear shaft or axle C. It is apparent that if the rear axle C be rotated rotary motion will be imparted to the shaft P, and thereby to the sprocket N. The latter may be clutched with either section of the upper shaft K, whereby either digger I will be caused to travel in the direction of the arrow, Fig. 1. For the purpose of thus causing rotation of the axle C it is requisite that the wheels D shall be locked therewith. To this end I provide clutches T, (see Fig. 2,) which are adapted to slide on the axle and have a spline connection therewith. The said clutches are arranged on the outer ends of the axle and when adjusted as shown in Fig. 2 they lock with corresponding half-clutches on the hubs of the wheels D, being held normally in such engagement by spiral springs U, which I arrange between the slidable clutches and collars on the ends of the axle.

When it is desired to throw the digger out of action and allow the wheels D to run free without rotating the axle C, the clutches T are moved outward by means of levers V. (See Figs. 1 and 2.) These levers are arranged in an oblique position and pivoted to rigid arms attached to the frame part A, their lower ends being forked and having a suitable loose engagement with the clutches. Ropes or chains W are attached to the upper ends of said levers and connected with a rotatable rod or shaft X, so as to wind thereon in opposite directions. The said rod X extends in the same general direction or plane with the levers to the front of the machine, being suitably held rotatably in boxes attached to the vertical frame A' and provided with a hand-wheel or equivalent means for rotating it. It is obvious that when the shaft X is rotated in one direction the levers V will throw the clutches T out of engagement, leaving the wheels D to rotate thereon; but when the shaft or rod X is released the tension of the springs U will force the clutches into reengagement, the ropes W being unwound by rotation of the rod X. For holding the latter locked, as may be required for throwing the clutches out of action, I employ a ratchet and pawl wheel Y, (see Fig. 1,) which, being constructed and applied in a well-known manner, require no specific description.

I provide means for throwing the upper sprocket N into or out of action by means of the hand-lever Z, (see Figs. 3 and 6,) which is fulcrumed at a fixed point on the frame A' and connected with sliding clutches $A^2$, which are permanently but slidably connected with shaft K and adapted to engage similar clutches on the hub of the sprocket-wheel N. By shifting the clutches $A^2$ through the medium of the branched lever Z either of the endless traveling diggers I may be thrown into or out of action, or the clutches $A^2$ may be so set as to leave the wheel N free to rotate without engagement with either shaft-section K.

It is often requisite that the diggers shall be caused to take into the soil at different depths, and for this purpose I make the lower shafts K' adjustable, as will now be described. The ends of said shafts K' enter slots formed in the lower ends of bars B', which are pivoted at their upper ends in the vertical frame A' and adapted to swing forward and back in a vertical plane. The upper ends of said bars B' are formed concentrically and fixed in corresponding sockets in frame A'. There are two pairs of such bars B', one pair for each digger I. For the purpose of adjusting the pivoted bars B' forward or back, as may be required by the difference of the soil and crop, I employ the following-described means: A metal band or strap C' (see Fig. 1) is applied to the lower ends of the bars B' and provided with lugs, to which stirrups or clevises D' and $D^2$ are hinged, as shown, the front clevis D' being attached at a point above the other $D^2$. A rope or chain E' is attached to the front clevis D' and passing over a pulley F', journaled at the front end of the machine, is attached to a rotatable vertical shaft G'. Another rope H' is attached to the rear clevis $D^2$ and passes over pulleys I', arranged in front of the rear wheels D, and extends forward and is attached to the same shaft G', so as to wind thereon in a direction opposite to that in which the rope E' is wound. It is apparent that by rotating the shaft G', which is provided with a hand-wheel for the purpose, the ropes or chains E' and H' will be alternately taken up or let out, as the case may be, and that thereby the bars B', in which the shaft K' has its bearings, will be swung further forward or back as required to bring the endless traveling diggers into action in the required manner or to take them out of action—i. e., raise them out of contact with the soil.

The rotary shafts G' are provided with a pawl and ratchet for locking them, as in the case of the shafts X, as before described. The machine delivers the mingled earth and onion-sets or vegetables into hoppers H, having spouts $H^2$, which converge and deliver the same into the inclined rotary screen L'. The latter is supported upon a rotatable shaft M', whose front end carries a beveled gear $M^2$, meshing with similar beveled gears N', fixed on the alined shafts P and P'. It is apparent that when the shaft P' is driving the screen L' will be caused to rotate at a slower rate, and at the same time motion will be communicated to the shaft P, as before described. The screen L' is cylindrical and constructed of woven wire supported by arms extending from the shaft M'. During the rotation of this screen the earth will be removed from the vegetables and discharged, while the vegetables themselves will be delivered from the rear end of the screen (see Fig. 4) upon an inclined platform O' and between inclined guides $P^2$. From such platform O' they will be allowed to discharge or fall into any suitable receptacle which may be placed upon the lower platform Q'. The latter also affords a suitable support for persons who may attend to the delivery of the onion-sets or other vegetables into sacks, baskets, or other receptacles.

What I claim is—

1. In a machine of the class specified, the combination, with a frame and wheels supporting the same, of an endless traveling digger having a series of scoops, sprocket-wheels for supporting and carrying the same, means for imparting movement thereto, and pivoted swinging bars arranged in the lower portion of the frame, an axle having its bearings therein, and means for adjusting the said bars forward and back, substantially as shown and described.

2. In a machine of the class specified, the combination, with a wheeled frame having a vertical portion upon which an axle and sprocket-wheels are supported, of an endless traveling digger comprising a chain and scoops attached thereto, bars pivoted to said frame and provided with slotted bearings in their lower portions, an axle adapted for adjustment in such slots, a sprocket-wheel mounted on said axle and carrying the endless digger, and means for adjusting the said bars forward and back, substantially as shown and described.

3. In a machine of the class specified, the combination, with a wheeled frame having a vertical portion as described, of an endless traveling digger, a sprocket-wheel arranged on the vertical frame and supporting the endless digger, means for rotating the same, bars arranged in a vertical plane and pivoted in the vertical frame of the machine and provided with bearings, an axle arranged in said bearings, and a sprocket-wheel carried thereby, ropes connected with the lower portions of said bars and extending forward and rearward over pulleys as described, and a shaft to which the said ropes are attached, so as to wind thereon in opposite directions, whereby the said bars and the lower portion of the digger may be adjusted for work or out of work, substantially as shown and described.

4. In a machine of the class specified, the combination, with a wheeled frame having a vertical extension, of an endless traveling digger, a shaft and sprocket supporting the same at the top of the frame, means for driving the digger, bars pivoted at their upper ends to the lower portion of the frame, a shaft having its bearings in said bars and provided with a sprocket-wheel upon which the lower portion of the digger travels, clevises pivoted to the lower portions of said bars, ropes connected with the said clevises, pulleys located in front and rear of the said bars, a vertical rotatable shaft provided with a hand-wheel, the aforesaid ropes passing over the pulleys and attached to the shaft so as to wind in opposite directions, substantially as shown and described.

5. In a machine of the class specified, the combination, with a wheeled frame of an endless traveling digger, means for supporting the same, hoppers and spouts for receiving the tubers from the diggers a cylindrical wire screen arranged at an inclination in rear of the spouts, a shaft upon which said screen is mounted, a bevel-gear fixed on the front end of said shaft, two alined horizontal shafts having bevel-gears meshing with the first-named gear, sprocket-gearing connecting one of said shafts with the rear axle of the machine, clutch-and-lever mechanism for locking the said axle with the running wheels thereon, and sprocket-gearing connecting the axle with one of the aforesaid horizontal shafts, substantially as shown and described.

6. In a machine of the class specified, the combination, with a wheeled frame and two endless traveling diggers, and means for carrying the same, of a clutch mechanism for throwing them into or out of action, a rotatable rear axle, means for locking the same with its running wheels, a cylindrical rotary screen, horizontal shafts and a bevel-gearing for driving it, and a sprocket-gearing for connecting the said axle with the gearing operating the screen, substantially as shown and described.

7. In a machine of the class specified, the combination, with a frame having horizontal and vertical portions, a rotatable rear axle, running wheels applied thereto, a clutch mechanism for locking the wheels to the axle, of endless traveling diggers, sprocket-wheels and a shaft therefor supporting the diggers at the top of the frame, a clutch and lever connected with said shaft, two alined horizontal shafts, and sprocket-gearing connecting one of these with the digger or upper shaft, and other gearing connecting the second alined shaft with the axle, a rotary screen geared with the alined shafts, and hoppers and spouts for delivering tubers from the diggers into said screen, substantially as shown and described.

J. WILL. JEFFERSON.

Witnesses:
 JOHN F. JEFFERSON,
 WM. RYAN.